June 16, 1959    N. ÅKE HOFFSTRÖM ET AL    2,890,754
APPARATUS FOR RECOVERING COMBUSTIBLE SUBSTANCES
FROM SUBTERRANEOUS DEPOSITS IN SITU
Filed Jan. 4, 1954      3 Sheets-Sheet 1

INVENTORS
NILS AKE HOFFSTROM
MALTE OSCAR EURENIUS

BY   Sol Shapiro

ATTORNEY

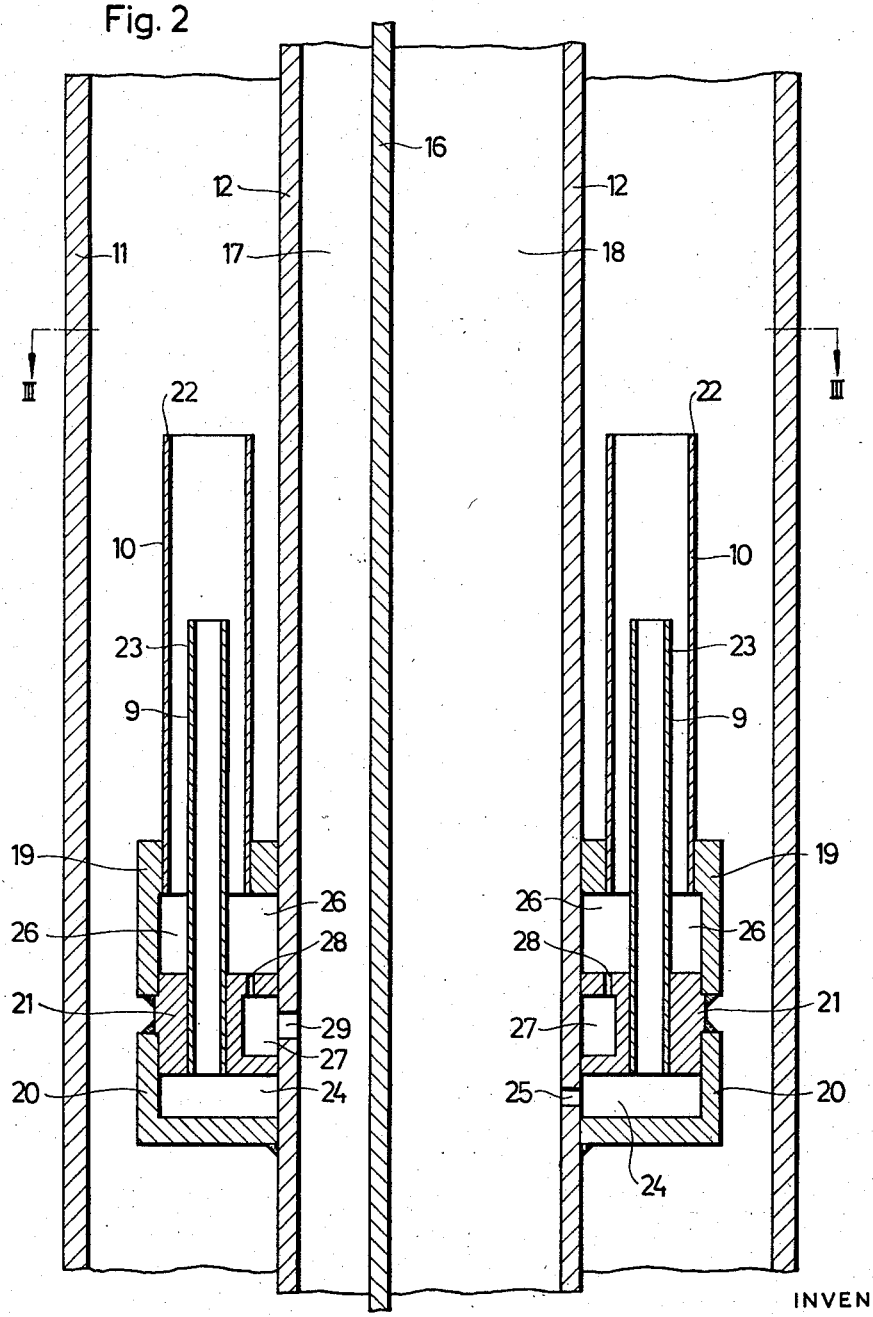

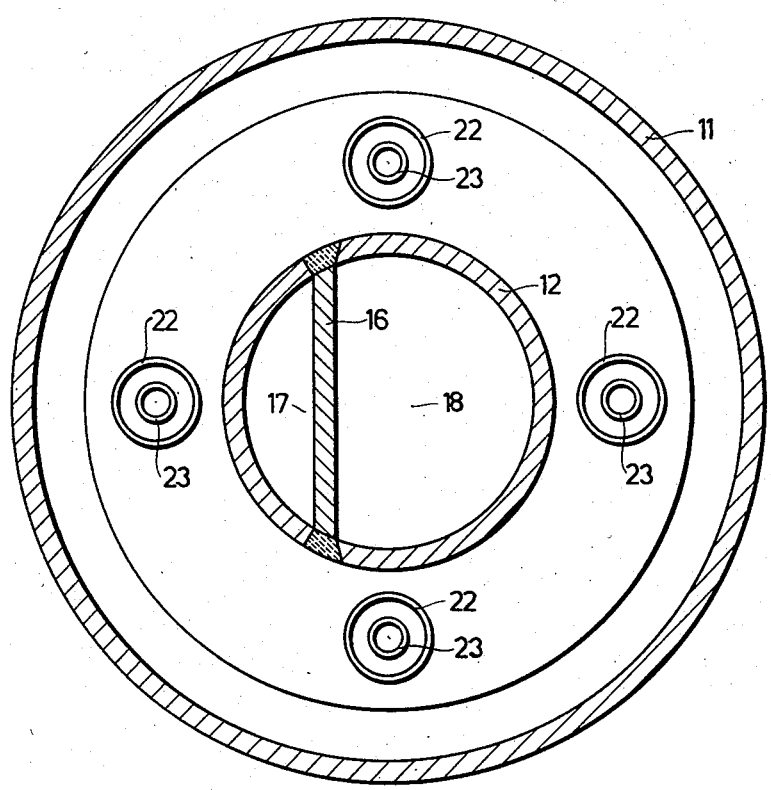

United States Patent Office 2,890,754
Patented June 16, 1959

2,890,754

APPARATUS FOR RECOVERING COMBUSTIBLE SUBSTANCES FROM SUBTERRANEOUS DEPOSITS IN SITU

Nils Åke Hoffström and Malte Oscar Eurenius, Kumla, Sweden, assignors, by direct and mesne assignments, of one-half to Svenska Skifferolje Aktiebolaget, Orebro, Sweden, a joint-stock company of Sweden, and one-half to Husky Oil Company, Cody, Wyo., a corporation of Delaware Application January 4, 1954, Serial No. 401,971

Claims priority, application Sweden October 30, 1953

10 Claims. (Cl. 166—59)

This invention relates to apparatus for heating subsurface geological deposits in situ in their natural condition in the ground for the purpose of recovering valuable substances in liquid and/or gaseous state. Examples for sub-surfaces deposits in consideration are shale strata, tar sand layers and sulphur deposits.

It is known in prior art to perform the heating by means of vertical holes or channels bored down from the surface on the earth into or otherwise produced in the deposit to be heated. Said holes or channels are entered by tubular heating members emitting their heat to the surrounding part of the deposit. The heat may be generated in several ways, for example by electricity in the manner disclosed in the French Patent No. 1,013,679. It is also possible to circulate a heat yielding medium such as superheated steam, for example, through the heating member. A further possibility is to create a combustion in the heating member. This last alternative is particularly advantageous in the exploitation by heating of fuel-carrying deposits, since considerable quantities of combustible gases generated by the heating process can be used directly as fuel in the continuing heating process. Said gases which otherwise are difficult to employ, in particular if they are of a composition making their condensation difficult, can thus directly come to economic application instead of being burnt in a power plant producing electric energy which roundabout way would cause considerable losses of energy.

When placing a conventional gas burner in the tubular heating member to be heated by combustion, the distribution of heat along the wall surrounding, or outer casing of the member will become very unequal, the portion adjacent the flame generated in the combustion becoming much more heated than other wall portions. In the heating of deposits or strata in their natural condition it is a desideratum that the whole part of the heating member located in the deposit or stratum to be treated is heated to at least approximately the same temperature. In order to accomplish such equal distribution of heat generation of a plurality of flames on different levels has been proposed in the above cited French patent. It has proved difficult, however, to attain for each flame the most appropriate proportion between the quantities supplied of gaseous fuel and combustion-sustaining medium such as air or oxygen.

In order to overcome said inconvenience, one primary object of the invention is to provide a heating apparatus of the type specified with means for supply of fuel and combustion-sustaining medium to each flame in suitable proportions for ensuring a combustion by which the wall of the heating member is heated uniformly over a predetermined length.

A further object of the invention is to provide an apparatus of the type specified with means adapted to produce thorough intermixture of gas and combustion-sustaining medium supplied to each of the flames in order to ensure complete combustion.

Further objects and advantages of the invention will be apparent from the following description considered in connection with the accompanying drawings which form part of this specification and of which:

Fig. 2 is a cross-sectional view of the apparatus shown in Fig. 1 but presented in an enlarged scale.

Fig. 3 is a sectional view following line III—III of Fig. 2.

Figure 1:
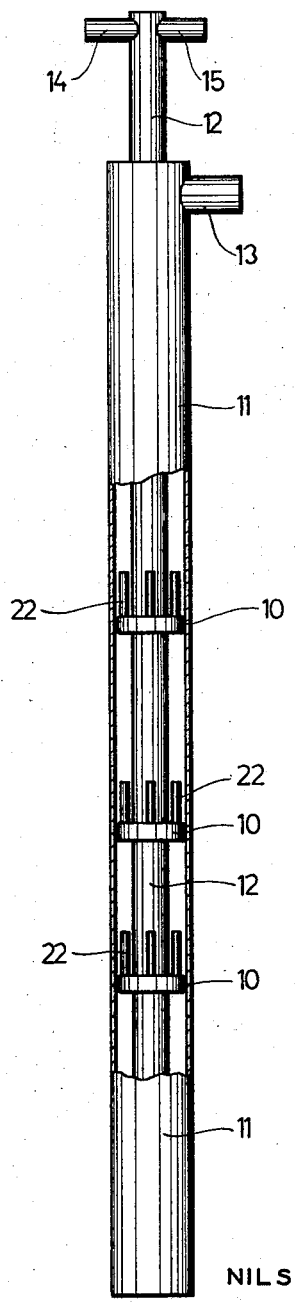
Fig. 1 is a side view of an apparatus embodying the invention, part of the outer wall or casing being cut away.

Referring to the drawings and in particular Fig. 1, the apparatus has a plurality of annular burner members generally denoted by 10 and located in the interspace between an outer wall or casing 11 encasing said burner members and an inner wall or tube 12 disposed substantially concentrically with the outer wall or casing 11. The spacing of the burner members 10 from one another is dependent on the distribution of heat desired along the outer casing 11.

It may be mentioned that the casing 11 and the tube 12 are presented in Fig. 1 in different scales with respect to their vertical and horizontal dimensions. In the vertical dimension, said members may in reality often have a length of about 20 metres, for example, whereas in the horizontal dimension the outer diameter of the casing will as a rule be less than 10 centimetres.

The tubular outer casing 11 is sealed on both ends, but adjacent the upper end which is intended to remain above the surface of the earth, said casing is provided with a connecting tube 13. From the same end of the casing 11 the upper end of the inner tube 12 projects upwardly. This projection is provided with two connecting tubes denoted by 14 and 15, respectively, and opening into the tube 12 at diametrically opposite points.

As will be seen from Fig. 3, the tube 12 is subdivided by a longitudinal partition 16 into two channels 17 and 18, respectively, of which the one channel communicates with one and the other channel with the other connecting tube 14 or 15, respectively.

The burner member 10 is a hollow annular body carrying a plurality of nozzles. The annular body is in sealing connection attached to the inner tube 12, but has no larger radial dimension than to leave a free annular space between its outer periphery and the outer casing 11. The member 10 is composed of three parts, viz. an upper part 19, a lower part 20 and an intermediate part 21. The nozzles are disposed in groups each of which comprises two nozzles located the one within the other. Fig. 3 presents four groups of said type disposed on one annular burner member, but it is to be understood that more or less than four groups of nozzles may be applied onto one burner member. Of the two nozzles belonging to each group, the one designated by 22 has a larger diameter than the other designated by 23, as will be apparent from Fig. 2. Both nozzles have approximately the same longitudinal dimension and are placed substantially concentrically the one within the other, but the nozzles 23 having the lesser diameter are disposed so as to extend from a lower level than the nozzle 22 having the larger diameter. The narrower nozzle 23 will thus terminate inside the surrounding wider nozzle 22 at a lower level than that of the edge of the opening of said nozzle 22. The narrower nozzle 23 is rigidly secured to and entirely penetrates through the intermediate part 21. Due to the cup-like shape of the lower part 20 an annular passage 24 is formed, the narrower nozzles 23 communicating with said passage which also communicates with the channel 18 by holes 25 disposed in the wall of the inner tube 12.

The wider nozzles 22 are rigidly secured to the upper part 19 and open into an annular passage 26 formed due to the cup-like shape of said upper part 19. The intermediate part 21, too, comprises an annular passage 27 which by a plurality of holes 28 communicates with the passage 26 in the upper part 19. Finally, the annular passage 27 communicates with the channel 17 by holes 29 disposed in the wall of the inner tube 12.

In operation of the heating device described above, fuel which preferably is a combustible gas, is supplied to the channel 17 through the connecting tube 14. From said channel 17 the fuel is fed to the various annular burning members 10. In each individual burning member the fuel is distributed by means of the annular passage 27 from which the fuel is introduced through the holes 28 into the annular passage 26 located thereabove and passes finally through the interspace between the narrower nozzle 23 and the wider nozzle 22. The holes 29 which are the first to be passed by the fuel are rather large for which reason a moderate throttling only of the flow of fuel is created there. The following holes 28 are considerably minor and provoke a more effective throttling. By said throttling measures the differences in pressure existent in the channel 17 are almost wholly equalized so as to ensure practically the same pressure of the fuel when supplied to the annular burner members irrespective whether their location is the highest or the lowest one on the tube 12 in the apparatus. The annular passages 26 and 27 have a pressure equalizing effect in the lateral direction so as to impart the same pressure to the fuel in each of the nozzles of the same burner member. Due to their small diameter the holes 28 enable such holes to be provided on the same level around the inner tube 12 in relatively large number. This arrangement affords additionally to the equalization of the pressure of the fuel supplied to the burner members the further advantage of ensuring undisturbed operation, if one or several holes should be clogged by solid particles carried along by the fuel, since the remaining holes are sufficient for permitting the flow of fuel to pass without any appreciable variation in pressure being created.

The combustion-sustaining medium is supplied in the form of air, for example, through the connecting tube 15 diametrically opposed to the connecting tube 14 through which the fuel is introduced. The air is distributed through the channel 18 to the individual annular burner members 10. It is permitted to penetrate into said members through the holes 25 opening into the annular passage 24. In this annular passage the air is distributed and finally escapes through the narrower nozzles 23. As far as the combustion-sustaining medium, such as air, is concerned, additional throttling holes are not necessary, because the holes 25 provided in the wall of the inner tube 12 can directly produce the required throttling effect. A relatively large number of said holes may be disposed and each individual hole may be given a correspondingly small diameter, since the channel 18 for the supply of the air has a larger cross-sectional area than the channel 17 for the supply of fuel, which relation is due to the necessity to supply a larger volume of air than fuel per unit of time in order to obtain complete combustion.

Upon ignition a flame will be formed in the broad nozzles 22. The primary object of said nozzles is to protect the flame from disturbances which otherwise easily would be caused by flue gases escaping from burner members located on a lower level. As is well known a flame is easily extinguished when becoming subjected to the influence of other gases having a high flow velocity. The diameters of the wide and the narrow nozzles have been dimensioned relatively to one another so as to obtain a suitable proportion between the flow velocities of the fuel and the air, respectively. The flue gases resulting from the combustion are allowed to pass through the interspace between the inner tube 12 and the outer casing 11 and to escape through the connecting tube 13. During said passage the flue gases yield part of their heat to the outer casing 11. The distribution of the heating temperature produced thereby is dependent on the manner of spacing the annular burner members from one another. If a substantially equal temperature is to be produced along the tubular casing 11, the burner elements 10 must be placed nearer to one another at the bottom than at the top of the casing, since near the top the flue gases from the bottom, too, contribute in the heating. Another possibility of adjusting the distribution of temperature consists in varying the number of groups of nozzles provided on each individual burner member. It may also be suitable to provide one or several portions of the outer casing 11 or/and the inner tube 12 with a protection against radiation or other suitable heat insulating means. Such protection is particularly desirable about the flames as well as that portion of the outer casing adjacent the earth surface. This portion is often desired to be prevented from becoming heated, since the surrounding geological formations usually are gravel or lime stone which are incapable of yielding valuable products when heated.

The heat remaining in the escaping flue gases may suitably be used for different purposes, such as preheating of the fuel and the air, preheating of deposit not yet heated, and fractional distillation of products recovered. For such heat recovery heat exchangers of well known constructions may be used, said exchangers being located either above-ground or below the surface in assembly with the heating apparatus in which latter case it preferably comprises the portion thereof desired to remain unheated.

The fuel need not be in gaseous form, it may be completely or partly replaced by liquid or solid finely distributed fuel. The combustion-sustaining medium may instead of air completely or partly be constituted by oxygen or another oxygen-containing gas mixture than air.

While a preferred embodiment of the invention has been described above, it is to be understood that this is for the purpose of illustration only and that the invention is not to be limited thereby, but its scope is to be determined by the appended claims.

What we claim is:

1. An apparatus for recovery of valuable products from a sub-surface geological deposit by heating of said deposit in its natural condition in the ground, comprising spaced outer and inner imperforate tubes closed at their lower ends defining an annular combustion chamber therebetween and adapted to be inserted into a bore hole in said deposit, burners mounted on said inner tube in spaced relationship and at different levels for discharging products of combustion into said chamber, and passage means carried by said inner tube for supplying fuel and combustion-sustaining medium individually to each of said burners.

2. Apparatus as claimed in claim 1 in which groups of said burners are located at said levels along said inner tube, each group of burners at each level including an annular distributing member carrying a plurality of nozzles.

3. Apparatus as claimed in claim 2 in which each burner includes an outer nozzle and an inner concentric nozzle, the outer nozzle having a larger inner diameter than the outer diameter of the inner nozzle, and the inner nozzle having its outlet opening located at a lower level than that of the outlet opening of the outer nozzle.

4. Apparatus as claimed in claim 2, said annular distributing member including intermixture means carried on the inner tube for distributing the fuel and combustion-sustaining medium to the nozzles.

5. Apparatus as claimed in claim 4 in which said annular distributing member comprises connecting channels disposed to guide the fuel and the combustion-sustaining medium to each nozzle.

6. Apparatus as claimed in claim 5 in which the connecting channels in each distributing member comprise passages having a reduced diameter to cause a throttling effect on the flow of fuel and combustion-sustaining medium, respectively, whereby the pressure in said members is at least approximately equalized.

7. Apparatus as claimed in claim 6, in which said annular distribution member is provided with a plurality of throttling passages to ensure undisturbed supply of fuel and combustion-sustaining medium irrespective of clogging of some passages.

8. Apparatus as claimed in claim 5 in which said connecting channels comprise relatively wide connecting passages to ensure equal supply of fuel and combustion-sustaining medium to each of the groups of nozzles.

9. Apparatus as claimed in claim 1 in which the inner tube is substantially concentric with the outer tube and the inner tube is divided by a longitudinal partition into supply channels for the fuel and combustion-sustaining medium respectively.

10. Apparatus as claimed in claim 9 in which distribution and intermixture means for said burners are arranged on the inner tube and are disposed along the inner tube in spaced relation from one another to provide desired distribution of temperature along the outer tube.

References Cited in the file of this patent

UNITED STATES PATENTS

| | | |
|---|---|---|
| 1,170,266 | Huff | Feb. 1, 1916 |
| 1,449,420 | Kreager et al. | Mar. 27, 1923 |
| 1,497,954 | Shaw et al. | June 17, 1924 |
| 2,255,540 | Dreffein | Sept. 9, 1941 |
| 2,675,081 | Nowak | Apr. 13, 1954 |
| 2,707,029 | Van Hartesveldt | Apr. 26, 1955 |

FOREIGN PATENTS

| | | |
|---|---|---|
| 155,732 | Great Britain | Dec. 30, 1920 |
| 123,137 | Sweden | Nov. 9, 1948 |